(12) United States Patent
Hichwa et al.

(10) Patent No.: US 6,785,038 B2
(45) Date of Patent: Aug. 31, 2004

(54) OPTICAL CROSS-CONNECT WITH MAGNETIC MICRO-ELECTRO-MECHANICAL ACTUATOR CELLS

(75) Inventors: Bryant P. Hichwa, Santa Rosa, CA (US); John S. Foster, Santa Barbara, CA (US); Richard T. Martin, Santa Barbara, CA (US); Paul J. Rubel, Santa Barbara, CA (US); John W. Stocker, Santa Barbara, CA (US); Jeffery F. Summers, Santa Barbara, CA (US)

(73) Assignee: Optical Coating Laboratory, Inc., Santa Rosa, CA (US)

( * ) Notice: Subject to any disclaimer, the term of this patent is extended or adjusted under 35 U.S.C. 154(b) by 147 days.

(21) Appl. No.: 09/765,522

(22) Filed: Jan. 17, 2001

(65) Prior Publication Data

US 2002/0093720 A1 Jul. 18, 2002

(51) Int. Cl.$^7$ ............................................. G02B 26/00
(52) U.S. Cl. ..................... 359/290; 359/291; 359/221
(58) Field of Search ..................... 359/224, 221, 359/230, 231, 252, 290, 291; 250/231.1, 231.18; 310/306, 307; 372/92; 385/14, 47, 49

(56) References Cited

U.S. PATENT DOCUMENTS

| | | | |
|---|---|---|---|
| 5,025,346 A | 6/1991 | Tang et al. .................. 361/283 |
| 5,459,602 A | 10/1995 | Sampsell ..................... 359/234 |
| 5,629,918 A | 5/1997 | Ho et al. ..................... 369/112 |
| 5,808,780 A | 9/1998 | McDonald .................. 359/290 |
| 5,867,297 A * | 2/1999 | Kiang et al. ................ 359/198 |
| 5,933,269 A | 8/1999 | Robinson .................... 359/280 |
| 5,945,898 A | 8/1999 | Judy et al. ..................... 335/78 |
| 5,994,159 A * | 11/1999 | Aksyuk et al. ............... 438/52 |
| 5,995,688 A | 11/1999 | Aksyuk et al. ............... 385/14 |
| 5,998,906 A | 12/1999 | Jerman et al. .............. 310/309 |
| 6,008,120 A | 12/1999 | Lee ............................ 438/634 |
| 6,031,947 A | 2/2000 | Laor ............................ 385/22 |
| 6,049,404 A | 4/2000 | Wu et al. .................... 359/117 |
| 6,049,650 A | 4/2000 | Jermain et al. ............. 385/137 |
| 6,072,924 A | 6/2000 | Sato et al. .................... 385/18 |
| 6,091,867 A | 7/2000 | Young et al. ................. 385/17 |
| 6,094,293 A | 7/2000 | Yokoyama et al. ......... 359/280 |
| 6,097,858 A | 8/2000 | Laor ........................... 385/16 |
| 6,097,860 A | 8/2000 | Laor ........................... 385/17 |
| 6,124,650 A | 9/2000 | Bishop et al. ................ 310/40 |
| 6,128,122 A | 10/2000 | Drake et al. ................ 359/224 |
| 6,229,640 B1 | 5/2001 | Zhang ........................ 359/290 |
| 6,256,430 B1 * | 7/2001 | Jin et al. ...................... 385/18 |
| 6,300,619 B1 * | 10/2001 | Aksyuk et al. ............. 250/216 |
| 6,300,665 B1 * | 10/2001 | Peeters et al. .............. 257/415 |
| 6,363,183 B1 * | 3/2002 | Koh ............................ 385/19 |
| 6,389,189 B1 * | 5/2002 | Edwards et al. .............. 385/18 |
| 6,449,406 B1 * | 9/2002 | Fan et al. ..................... 385/17 |
| 6,453,083 B1 * | 9/2002 | Husain et al. ................ 385/17 |
| 6,545,796 B1 * | 4/2003 | Greywall .................... 359/291 |
| 6,556,739 B1 * | 4/2003 | Kruglick ...................... 385/17 |
| 6,600,851 B2 * | 7/2003 | Aksyuk et al. ............... 385/18 |
| 6,606,428 B2 * | 8/2003 | Goldstein et al. ............. 385/18 |

FOREIGN PATENT DOCUMENTS

WO WO 00/25160 5/2000 ............ G02B/6/26

* cited by examiner

Primary Examiner—Jordan M. Schwartz
Assistant Examiner—Jessica Stultz

(57) ABSTRACT

An optical cross-connect is fabricated on a substrate using individual MEMs dice with mirrors that rotate into and out of an optical beam path. Each die can be aligned to a single (input-output) pair of collimators in a fiber-optic switching system. An individually accessible magnetic drive on each die provides low power consumption when re-configuring the array in addition to fast switching speeds. The state of each die can be electronically sensed to verify proper array configuration and operation of each die.

24 Claims, 9 Drawing Sheets

OPTICAL CROSS-CONNECT WITH MAGNETIC MICRO-ELECTRO-MECHANICAL ACTUATOR CELLS

CROSS-REFERENCE TO RELATED APPLICATIONS

This U.S. patent application is being concurrently filed with U.S. patent application Ser. No. 09/765,520 entitled, OPTICAL SWITCH WITH LOW-INERTIA MICROMIRROR by Feierabend et at. (Attorney Docket No. OC0100US); and U.S. patent application Ser. No. 09/764,919 entitled LOW INERTIA LATCHING MICROACTUATOR by Feierabend et al. (Attorney Docket No. 111500-IMT).

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

The invention relates generally to optical switching arrays, and more specifically to an optical cross-connect of micro-electro-mechanical system cells, each cell having a magnetic actuator and integrated mirror.

The use of optical signal transmission is rapidly growing in the telecommunications ("telecom") industry. In particular, optical transmission techniques are being used for local data transfer ("metro"), as well as point-to-point "long-haul" transmissions. Similarly, the number of optical signals, or channels, carried on an optic fiber is growing. The implementation of wave-division multiplexing ("WDM") has allowed the number of channels carried on a fiber to increase from one to over 16, with further expansions planned.

Thus, the need for optical switching technology is expanding. In the case of WDM technology, an optical channel is removed from a multi-channel fiber with an optical bandpass filter, diffraction grating, or other wavelength-selective device, and routed to one of perhaps several destinations. For example, a channel on a long-haul transmission line might be routed between a local user for a period of time and then switched back onto the long-haul transmission line ("re-inserted"). This is known as 1×2 switching because a single input is switched between one of two possible outputs. As the complexity of optical networks grows, the complexity of the desired switching matrices also grows.

Switching matrices are being developed for several different optical network applications. "Small fabric" applications have been developed using 1×2, 2×2, and 1×8 type switches. However, there is a need for "medium fabric" applications that can provide 8×8 up to and beyond 32×32 type switching arrays, and even for "large fabric" switching arrays that can handle 1024×1024 or more switching applications. The switching arrays that allow any input to be connected to any output are generally called "cross-connects", but in some applications there may be limited switching of some ports.

Unfortunately, attempting to merely scale the techniques developed for small fabric applications may not meet system requirements, such as switching speed, switching array space limitations, and power limitations. In particular, it is often desirable to upgrade an optical network to handle more traffic by adding additional channels onto the installed fiber base, and that the switching arrays be able to fit into the existing "footprint" allowed for the switching matrix. In many cases, the footprint is actually a 3-dimensional restriction. Similar restrictions might apply to the available power, or allowable power dissipation.

Various techniques have been developed to address the problems arising in the development of more complicated switching arrays. Several approaches have adapted photolithographic methods developed primarily for the field of semiconductor processing to the fabrication of optical switching arrays. In one approach, micro-electro-mechanical systems ("MEMS") are used to create a very small motive device (motor), such as an electrostatic comb drive, electrostatic scratch drive, magnetic drive, thermal drive, or the like, attached to an optical switching element, typically a mirror. The mirror is usually either fabricated in the major plane of the process wafer and rotated to become perpendicular to a switchable light signal, or is fabricated perpendicular to the major plane of the wafer. In the first instance, establishing and maintaining verticality of the mirror is very important to ensure that the light signal is reflected to the desired output port. In the second instance, fabricating a mirror-smooth surface on a vertical plane of the wafer can be difficult, as can be depositing a reflective metal layer on that surface.

Another approach uses cantilevered beams that bend away from the major plane of the substrate in response to a magnetic field. An electrostatic field can be used to hold the cantilevered beam, which can have a mirror on its end, in a switch position when the magnetic field is removed. Again, maintaining the verticality of the mirror during switch operation or after many switch cycles is important. If many cantilevered mirrors are used in an optical switching array, the magnetic field might be applied globally to the entire array, thus field uniformity issues might arise.

However, MEMS technology has the advantage of using photolithography to establish a precise relationship between MEMS cells on a wafer, and between elements within a cell. Several MEMS approaches involve fabricating one portion of the entire switching array on a first chip, fabricating a second portion of the entire switching array on a second chip, and then aligning and assembling the two chips to result in the switching array. While this approach appears convenient in that all 1,024 switch elements in a 32×32 array, for example, might be assembled at once, a defect in the alignment and assembly process can ruin the entire assembly. Similarly, each optical input signal needs to be aligned to each of its associated output paths. Even with MEMS technology, such simultaneous alignment is difficult.

Furthermore, additional cells are usually provided on the chip(s) to account for bad cells. For example, a 40×40 array might be built if a 32×32 array is desired, in case some of the cells in the included 32×32 array are bad. The switching array can be assembled to avoid the bad cell by using one of the 8 "extra" paths. However, this approach takes up additional space on the wafer, affecting yields, and doesn't work if more extra paths are required than what has been designed for. Furthermore, the control logic required to switch the semi-custom switching array is different from a standard array. This lack of standard switching logic can contribute to signal routing problems, both upon installation or replacement of a switching array.

Thus, a need exists for optical switching arrays that provide complex, efficient optical switching functions in a small footprint with high switching speeds and low power requirements.

BRIEF SUMMARY OF THE INVENTION

An optical cross connect is fabricated from MEMS cells edge-mounted to mounting substrate serving as a miniature optical bench. Each cell is individually addressable and raises a mirror at least 400 microns above the upper edge of the cell, allowing individual addressing of cells and switching of free space optical beams for high isolation between channels. The mirrors are rotated about an axis essentially parallel to the major surface of the mounting substrate. Optical input fibers and collimators are mounted on fiber mounting blocks bonded to the mounting substrate. In a preferred embodiment, the mounting substrate, fiber mounting blocks, and MEMS cells are made of silicon to match thermal expansion.

The individual drive mechanisms on each cell allow the configuration of the cross connect to be determined without disrupting any optical path by measuring the impedance of the drive circuit. In a particular embodiment, the drive mechanism is a magnetic drive that moves a magnetic slug or tab affixed to the mirror structure between magnetic poles on the base of the cell to latch the mirror either an extended or retracted position. In one embodiment, such a drive is insensitive to the polarity of the control signal, or pulse. In a further embodiment, the duration of the pulse is selected to first accelerate, and then decelerate the magnetic tab and hence mirror. This reduces bouncing and improves settling time.

Providing individual drives also results in low power requirements, as generally only 2N cells need to be switched to completely reconfigure the cross connect. In many operations reconfiguration is achieved by switching even fewer cells. Thus, the cross connect does not require switching of a high-power global magnetic or electronic field. Power requirements are further reduced by a latching spring that holds the mirror in the first switch position or the second switch position without applied electric power. Thus, the cross connect can maintain its configuration even in the event of a power failure.

By assembling the optical cross connect one die at a time, each die may be aligned to a single fiber pair, thus avoiding compromises arising from having to align an optical switching element to several fibers. Similarly, die may be selected according to the quality of the mirror surface, with better mirrors being assembled in the longer and/or shorter beam paths.

DETAILED DESCRIPTION OF THE INVENTION

I. Introduction

An optical cross-connect is fabricated by assembling MEMS cells on a substrate serving as an optical bench. Each MEMS cell has a mirror formed on the major surface of the MEMS silicon-on-insulator substrate. A silicon flexure pivot hinge on an end of an arm integrated with the mirror allows the mirror to rotate about an axis perpendicular to the major surface of the MEMS cell. The cells are edge-mounted to the cross-connect substrate and the mirrors are raised and lowered into and out of the path of an optical beam to direct the beam in a selected fashion. The optical beam originates from an optical input fiber with fiber-end optics that convert the light signal carried on the fiber into a beam. Optics on the ends of the output fibers collect the light beam and focus it onto the end of the desired output fiber. This free-space optical beam approach provides low inter-channel "crosstalk". A magnetic actuator between the hinge and the mirror provides sufficient motive force to use a lever effect to move the mirror a greater distance than the actuator. Thus, a relatively large mirror can be quickly and efficiently switched. Alternatively, a smaller mirror can be switched with even greater speed.

II. A Magnetic MEMS Optical Switching Cell

Figure 1A:
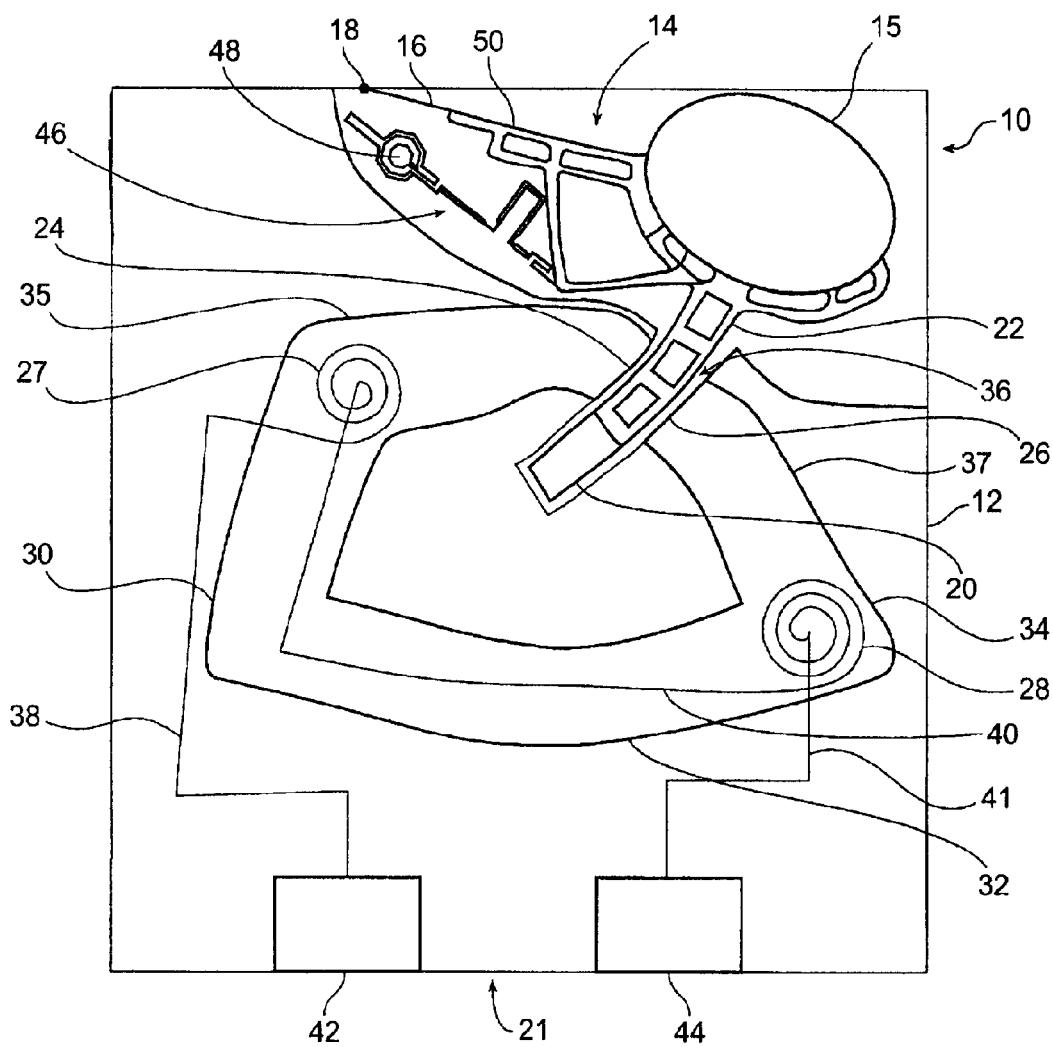
FIG. 1A is a simplified top view of a MEMs cell according to an embodiment of the present invention in a retracted state.

FIG. 1A is a simplified top view of a magnetic MEMS cell 10 in a first (retracted) position. The cell, or die, is about 2.3×3.1 mm. Generally speaking, several cells are fabricated on a silicon-on-insulator (SOI) substrate, and the individual cells are then cut out of the substrate. Features are defined in the overlying thin layer (~10–80 microns) of single-crystal silicon (the "superstrate") by photomasking and etching processes. The underlying oxide material is then removed from beneath at least the movable portions of the device using a selective etch process. In some instances, a strip of cells, i.e. a portion of a row or column of cells on the substrate is cut out. The cell includes a base portion 12 and a pivoting member 14. The base portion is typically bonded to a carrier or mounting substrate at an edge 21 of the die and the pivoting member moves relative to the base portion.

The pivoting member 14 is attached to the base portion 12 with a hinge 16 and essentially rotates about a hinge attachment post 18. The actual center of rotation of the pivoting member varies with the amount of rotation relative to the base. The true rotational center generally describes an arc as the pivoting member pivots, due to the offset between the hinge attachment post 18 and the spring anchor point 48. Thus the motion of the movable element is approximately circular. The hinge is a narrow isthmus of single-crystal silicon that allows at least about thirty degrees of rotation. The hinge is a flexure pivot that provides stability to the pivoting member to maintain planarity with the base during rotation while avoiding "stiction" (sticking friction) that often plagues bearing structures included in MEMS devices. The hinge is also relatively stiff to tensile and compressive loads on the pivoting member. An attachment post (see FIG. 1C, ref. num. 52) underlying the hinge attachment post connects the pivoting member to the base portion.

Figure 1B:
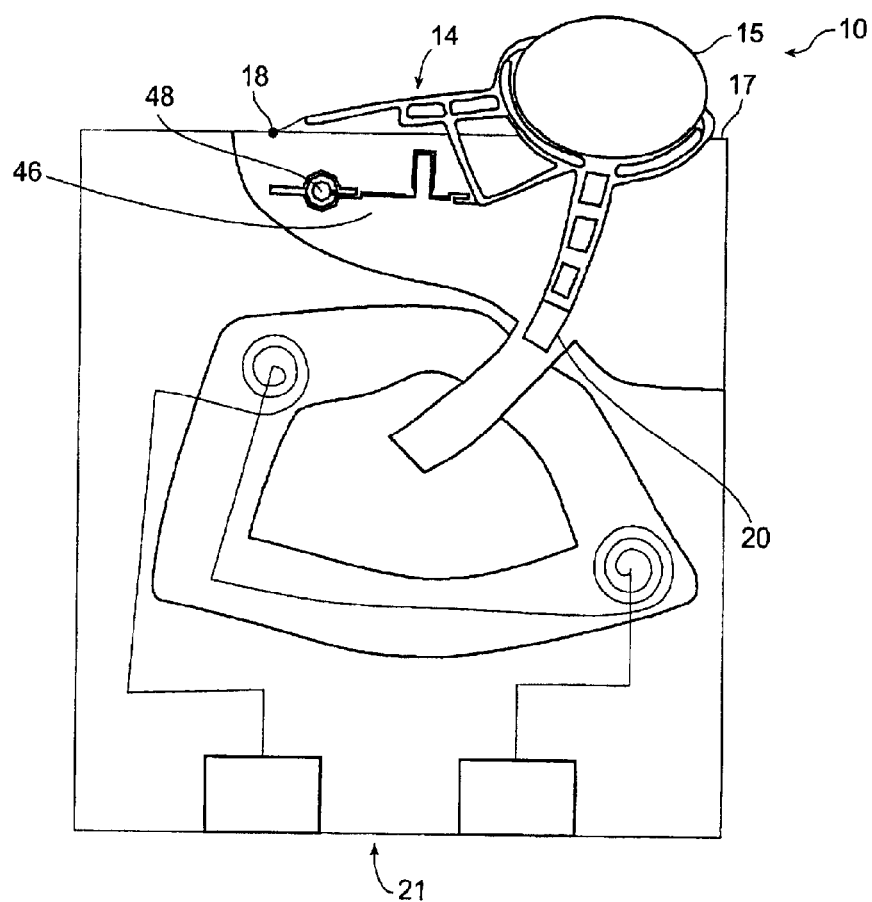
FIG. 1B is a simplified top view of the MEMs cell illustrated in FIG. 1A in an extended state.

The pivoting member 14 includes a magnetic tab 20 formed on an arm 22. The arm moves between two poles 24, 26 when the die is toggled (compare to FIG. 1B) to raise and lower a mirror 15 or other optical element. Current-carrying coils 27, 28 activate the magnetic circuit, which is completed by the magnetic bridges 30, 32, 34 to pull the magnetic tab 20 into the gap 36 between the poles to provide a lower energy path for the flux between the cores 35, 37. However, the magnetic tab continues through the gap until the pivoting member achieves a stable position, i.e. latches. In this example, the pivoting member has two stable positions, which will be referred to as "retracted" (FIG. 1A) and "extended" (FIG. 1B).

Electric current is provided to the coils 27, 28 through metal traces 38, 40, 41 connecting the coils to edge connectors or bonding pads 42, 44. The traces and connectors/pads can be made of any of several suitable conductive materials, such as plated copper. The edge connectors are desirable when edge mounting several dice on a printed wiring substrate. Solder, eutectic, conductive epoxy, or similar material can then be used to connect the edge connectors to the patterned traces on the printed wiring substrate.

A variety of conductive windings are available that could induce the magnetic flux in the cores. "Pancake" style windings are illustrated in FIGS. 1A and 1B, which are commonly used in the recording head industry. Other windings could be used, including toroidal windings made using thin-film techniques, solenoid windings, and windings of insulated wire made by hand or machine.

One advantage of using the magnetic motor, compared to an electro-static comb drive, for example, is that the magnetic motor is a current-based device that can operate at a significantly lower voltage. While typical operating voltages for electrostatic comb drives might be in the range of 20–40 V, magnetic motors according to the present invention can operate with a drive signal less than 10 V, and in some embodiments, about 5 V. This provides several practical advantages. First, many drive or control circuits use power in the 5–10 V range, thus these supplies can be used directly or stepped down with a simple voltage regulator. In contrast, higher voltages are typically generated with voltage boost circuits, which can consume significant wafer area. Additionally, fabricating these voltage boost circuits might require modifications to the semiconductor fabrication process to provide dielectric layer suitable for operation at the higher voltages.

A number of additional coils, similar to or different from each other, can be included to increase the number of current loops driving flux through the core. The coils are connected in series, that is the current flows from one bonding pad, through a first coil, through the second coil, and back to the other bonding pad. A variety of other circuits could be used, such as a parallel circuit, or the base portion (substrate) can provide a ground connection to sink or source current.

The magnetic tab 20 can be made of ferromagnetic material or permanent magnetic material. In a preferred embodiment, a ferromagnetic nickel-iron alloy with 45% nickel and 55% iron is chosen. This alloy is commonly known as PERMALLOY. The patterned core(s) and magnetic bridges are also formed from this alloy; however, the cores do not have to be of the same material as the magnetic tab, and other materials for either could be chosen, including other nickel-iron alloys. Thin layers of dielectric material generally separate the energizing coils, traces, and metal magnetic structures from each other, with vias through the dielectric layers providing a conductive connection where desired.

Flux is induced in the core by energizing the coils 27, 28. The flux circulates through the core, to the poles and across the gap. The interaction of the gap field with the magnetic tab attracts the magnetic tab toward the gap, thus producing a torque on the pivoting member. The torque draws the magnetic tab toward the centered position between the poles. The inertia of the rotating mass of the pivoting member 14 carries it through the centered position toward another stable position derived from a latching spring system. Other equivalent actuators, such as other magnetic actuators or electro-static actuators, may become apparent to those skilled in the art. In particular, the hinged design allows adaptation of various actuators by positioning the actuators on the pivoting member to take advantage of various lever arrangements.

A spring structure 46, which in this instance extends generally from a spring anchor point 48, also connects the pivoting member 14 to the base portion 12 through an attachment post (not shown) underlying the spring anchor point. The pivoting member is rigid to radial compression through the rigid load beam 50. The hinge 16 connects the load beam to the hinge attachment post 18. The hinge 15, rigid load beam 50, spring structure 46, and other elements of the pivoting member 14 are monolithic, that is they are all formed from the single-crystal silicon superstrate by selective removal of the surrounding material.

FIG. 1B is a simplified top view of the MEMS cell 10 illustrated in FIG. 1A in the extended, rather than retracted, position. The spring structure 46 is an essentially radial spring that latches the pivoting member in either the retracted or extended position. The pivoting member is driven between the positions, as described above, by the interaction of the gap field with the magnetic tab 20. Various spring latching systems can be fabricated to achieve numerous stable states. In this instance, the latching system is formed by having two different attachment points for the pivoting member, namely the hinge attachment post 18 and the spring attachment post 48. All of the mirror 15 extends beyond the upper edge 17 of the die, but such extension is not essential. In a preferred embodiment the mirror extends at least 400 microns above the edge of the die to facilitate switching of free-space optical beams.

III. Fabrication of Large Superstrate Elements and Mirror

In conventional MEMS fabrication processes, clearing the oxide bonding layer from between the superstrate and the substrate to free movable portions of the device is often done by insuring that the width (looking down from above the device) of any portion of the movable element is sufficiently thin so that undercutting by the etchant from both sides is sufficient to completely remove the oxide. In other words, the undercutting will coalesce to free the movable element. Hence, many conventional MEMS devices limit the design of the movable elements to narrow portions. In some instances, the thickness of the superstrate is used to fabricate larger structures, such as mirrors, but this presents additional challenges in forming a flat, smooth surface and deposition of the reflective layer(s) on a vertical surface (i.e. perpendicular to the major surface) of the device. Another approach has been to perforate the superstrate to provided additional access of the etchant to the underlying bonding layer. However, such perforations might be undesirable in some structures. Thus, it is desirable to form large movable structures in the superstrate without perforating those structures.

In the MEMS cell illustrated in FIG. 1A there are four large structures formed monolithically in the superstrate: The hinge anchor post, the spring anchor post, the magnetic tab, and the mirror. The hinge anchor post and the spring anchor post take advantage of the large size of these structures to connect the substrate to the pivoting member. The magnetic tab and mirror are freed from the substrate by one of two ways.

Figure 1C:
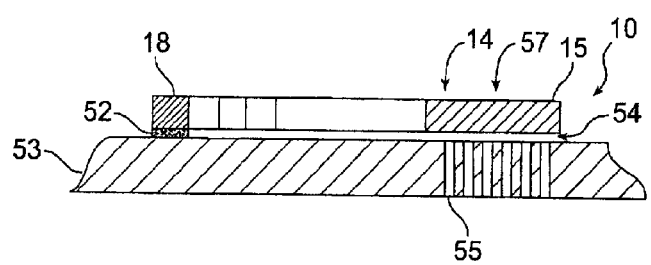
FIG. 1C is a simplified cross section of a portion of a MEMs cell according to an embodiment of the present invention.

FIG. 1C is a simplified cross section of the MEMS cell illustrated in FIGS. 1A and 1B, above, through a plane intersecting the hinge attachment post 18 and mirror 15. The hinge attachment post is attached to the substrate 53, which is typically about 500 microns thick, through the attachment post 52, which is formed of material originally between the superstrate and the substrate 53. The substrate is also silicon and the intervening material is silicon dioxide, typically about 2 microns thick, although other substrates and bonding interface materials can be used. This material has been removed from beneath the pivoting member 14, leaving a void 54, thus allowing the pivoting member to rotate in relation to the substrate. The pivoting member is otherwise aloft of the substrate and free to move.

Selective etchant (e.g. HF acid or buffered HF acid solution) is provided to the backside of the mirror 15 via perforations 55 through the substrate 53. Similar perforations are provided beneath the magnetic tab area These perforations are formed using backside photolithography and silicon etch steps. A selective etch that preferentially removes silicon can be used, including a directed plasma (anisotropic) etch. After the backside silicon etch and the topside silicon etch (to define the structures in the superstrate), an isotropic etch using an HF solution removes the intermediate silicon dioxide to free the pivoting member from the substrate. Thus, the large structures in the pivoting member can be formed without topside perforations.

A high-quality mirror surface can then be achieved with a chemical polishing step that removes a slight amount of material from the major surface 57 of the die/mirror. Other steps, such as thermal oxide formation and stripping, can also be used to smooth the surface of the mirror. The major surface presents a major crystal plane, such as a 111, 100 or 110 plane, and is the 100 plane in a particular embodiment, allowing a nearly atomically flat mirror surface to be formed. Similarly, the major surface of the mirror is available for depositing a high-quality reflective coating, such as a uniform thin layer of gold or aluminum. Furthermore, other types of reflectors, such as dielectric thin-film stack reflectors, including frequency-selective reflectors (thin-film optical filters), can be deposited on the major surface of the mirror.

Figure 1D:
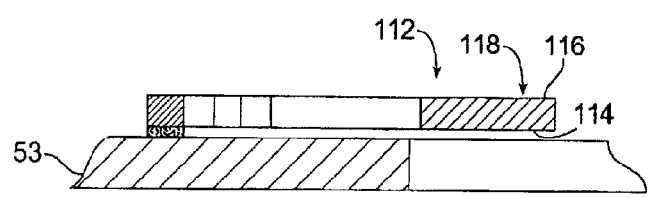
FIG. 1D is a simplified cross section of a portion of a MEMs cell with a two-sided mirror according to another embodiment of the present invention.

FIG. 1D is a simplified cross section of a portion of a MEMS cell 112 according to another embodiment of the present invention. The portion of the substrate 53 underlying the mirror field 116 has been removed to expose the backside 114 of the mirror structure. Thus this mirror can be a two-sided mirror. In other words, a first mirror coating(s) can be applied to the frontside 118 the mirror and a second mirror coating(s) can be applied to the backside 114 of the mirror. Alternatively, only a single side (either front or back) is mirrored. The mirror can be raised for backside coating by using a micromanipulator to push the mirror into the latched raised position that exposes the backside of the mirror, rather than removing the substrate underlying the mirror. In another embodiment the mirror is fabricated in the raised (extended) position with the substrate underlying the mirror removed for backside coating.

Figure 1E:
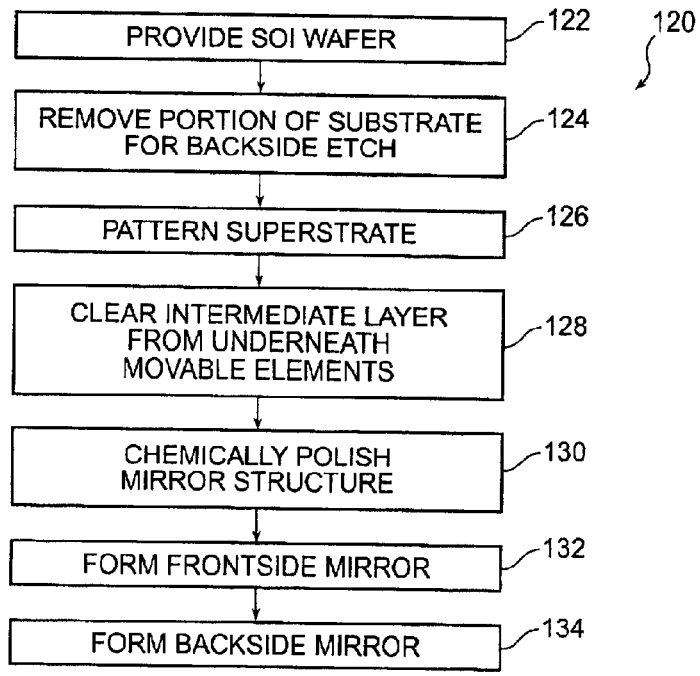
FIG. 1E is a simplified flow chart of a process for fabricating a MEMs cell according to an embodiment of the present invention.

FIG. 1E is a simplified flow chart of a method 120 for fabricating a MEMS device according to an embodiment of the present invention. A wafer having a substrate, an intermediate layer, and a superstrate is provided (step 122). A selected portion of the substrate is removed (step 124) to provide an etchant path to the intermediate layer. In one embodiment the selected portion of the substrate that is removed is a plurality of vias or perforations through the substrate to the intermediate layer. In another embodiment the selected portion of the substrate that is removed is a contiguous field of the substrate. A selected pattern is formed on the superstrate (step 126), the selected pattern including a large movable feature overlying the removed portion of the substrate. The intermediate layer is then etched away from beneath the large movable feature and other movable elements of the selected pattern formed in the superstrate (step 128).

In a further embodiment, the large movable feature is a mirror structure. The mirror structure is chemically polished (step 130) on a major crystalline plane, and a mirror coating is formed on the mirror surface (step 132). In yet a further embodiment, the selected portion of the substrate is a contiguous field underlying the mirror and a second mirror coating is formed on the backside of the mirror structure (step 134). In an alternative embodiment, the surface(s) of the mirror structure are sufficiently flat and smooth to omit the chemical polishing step.

IV. Switch Operation

The MEMS cells illustrated above in FIGS. 1A and 1C can operate from a single-sided pulse. That is, current through the coils will create a magnetic flux across the drive poles that will attract the magnetic tab from either the extended or the retracted position. Switching between positions, in either direction, will be referred to as "toggling". Furthermore, current flowing in either direction will attract the tab toward the poles. This simplifies operation of the cell compared to other MEMS devices that require bipolar drive signals. Similarly, because the actuator is based on magnetic attraction, rather than electrostatic, it is a current, rather than a voltage, device. This allows the use of lower voltage drive signals, particularly the use of voltage less than 40 V. Voltages above 40 V present a shock hazard to the operator and are more difficult to generate in a voltage boost pump circuit, typically requiring additional voltage pump stages.

Optical switches according to the present invention achieve switching from one state to another in less than 50 mS, which is desirable for SONET-type applications. In a particular embodiment, a switch changes states in less than 5 mS, and in yet a further embodiment, a switch changes states in about 1 mS or less with a maximum applied voltage of about 5 V or less.

Figure 1F:
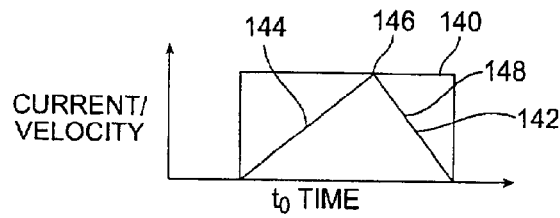
FIG. 1F is a simplified graph of current and velocity versus time illustrating braking during switching of a MEMs cell according to an embodiment of the present invention.

FIG. 1F is a simplified graph of current 140 supplied to the coils and velocity 142 of the pivoting member as a function of time. When the current starts at to the pivoting member starts to accelerate 144 and continues accelerating as the magnetic tab passes through the drive poles 146. The momentum of the pivoting member and spring force, if any, carries the magnetic tab past the poles. However, the current pulse is maintained and the pivoting member starts to decelerate 148 because the poles continue to attract the magnetic tab. Hence, a single, uni-polar pulse not only toggles the device, but also brakes (decelerates) the device, thus reducing bounce and settling time. The graph is idealized for simplicity of illustration, and the velocity might not be symmetrical about the center point, or reach zero when the pulse stops.

Figure 1G:
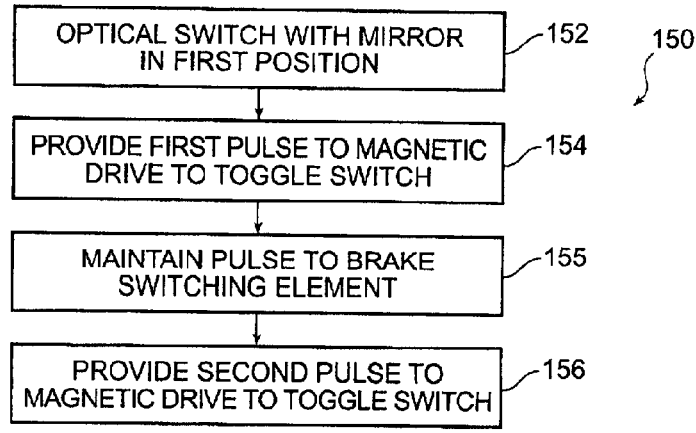
FIG. 1G is a simplified flow chart of a method of operating a MEMs cell according to an embodiment of the present invention.

FIG. 1G is a simplified flow chart of a method for operating a MEMS optical switch 150 according to an embodiment of the present invention. Optical switching can be achieved by rotating the mirror about the hinge attachment post to extend and retract the mirror, for example. Other optical elements, such as filters, diffraction gratings, or lenses could be used. A MEMS optical switch with a magnetic drive actuator is provided in a first position (i.e. extended or retracted) (step 152). A first pulse is provided to the magnetic drive actuator (step 154) to toggle the optical switch by rotating a hinged optical element in the major plane of the optical switch in a first direction (e.g. clockwise) about an axis (hinge attachment post) essentially perpendicular to the major plane of the optical switch. A second pulse is provided to the magnetic drive actuator (step 156) to toggle the optical switch by rotating the optical element in a second direction (e.g. counter clock-wise) about the axis. In one embodiment the pulses are uni-polar. In a further embodiment the first pulse is maintained (step 155) to brake the motion of the optical switch.

V. Latching Spring Mechanism

Figure 2A:
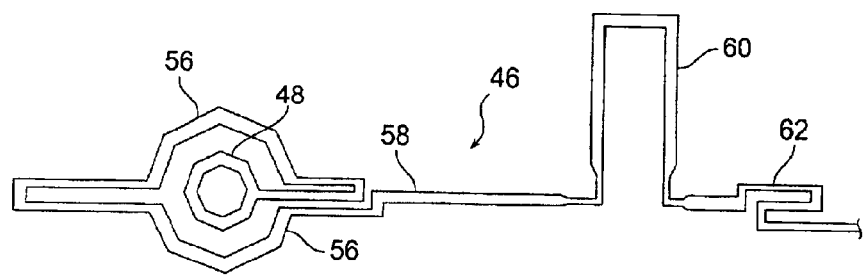
FIG. 2A is a simplified top view showing details of the spring structure illustrated in FIG. 1A.

FIG. 2A is a simplified top view of a spring structure 46 used in a latching MEMS cell according to FIGS. 1A and 1B, above. The spring structure joins the pivoting member (not shown in this view) to the substrate through the spring anchor point 48. The spring anchor point is not co-located with the hinge anchor point (see FIG. 1A, ref. num. 18), and provides a different radius of curvature. The spring structure includes a "clam-shell" pivot 56, a stiff load beam 58, a "C"-spring 60, and a serpentine spring 62.

The spring is anchored to the substrate through the clam-shell pivot 56. This pivot allows angular motion about the spring anchor point 48, but avoids a continuously rotating bearing, which is far more complex to fabricate and is subject to stiction and wear. The restoring force of the clam-shell pivot is small, such that through the arc of travel between the extended and retracted positions, the restoring force is dominated by the radial C-spring 60 rather than the clam-shell pivot.

The beams of the clam-shell pivot 56 are arranged so that they wrap around the spring anchor point 48. As the pivoting member is rotated, the beams forming the clam-shell pivot above the spring anchor point bend in the opposite direction as the beams below the anchor point. It is understood that "above" and "below" relate to the beams as illustrated in FIG. 2A, and that they are fabricated in the same plane of the device and may not be above or below each other in operation. This creates a circular rotation about the anchor point. Spring structure 46 is very stiff to radial loads, due to the number of beams, their relatively small length, and the fact that the rotation of the mechanism is such that the majority of radial load on the hinge is in the direction to apply compressive or tensile load.

The stiff load beam 58 links the clam-shell pivot 56 to the C-spring portion 60 of the spring structure. The stiff load beam is designed to stiffen the spring structure in the radial direction. Radial compression of the spring structure takes place predominantly in the C-spring portion, which is designed to be stiff in bending but compliant in radial compression.

The serpentine spring 62 is the final component of the spring structure. The serpentine spring connects the C-spring 60 to the pivoting member (not shown in this view) at the end of the spring structure opposite the spring anchor point. When the pivoting member rotates, the serpentine spring has a torque applied to it by the changing of relative angles between the pivoting member and the spring structure. This torque can be significant and can cause the spring structure to rotate in a non-circular fashion. The serpentine spring 62 reduces the rotational stiffness by distributing the stress over an effectively longer beam length, and yet maintains a very high radial stiffness, which is desirable. Compared to a simple flexing beam hinge, the serpentine spring reduces the rotational stiffness of the entire system.

Figure 2B:
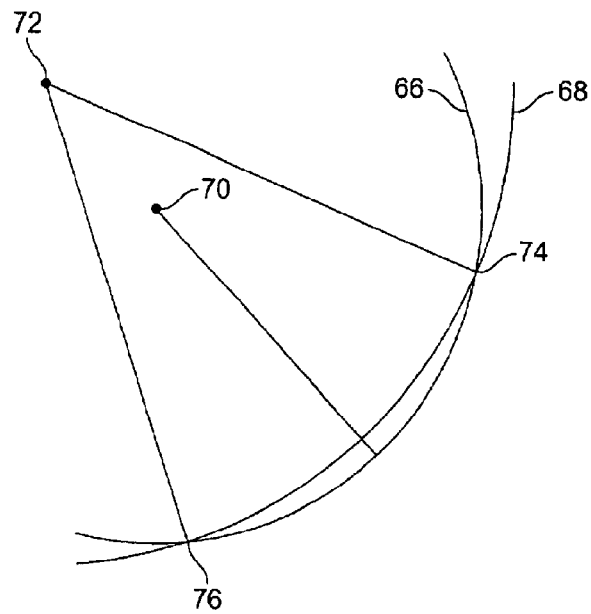
FIG. 2B is a simplified chart illustrating the motion of the spring structure and pivoting member about two non-co-located centers.

FIG. 2B is a simplified plot of the motion of the spring structure about the spring anchor point and the pivoting member about the hinge attachment post if the two structures were not joined together. Their independent motions could be characterized by two arcs of rotation 66, 68 with different radii of curvature about two different centers of rotation 70, 72. As can be seen from the diagram, the arcs of rotation have two intersection points 74, 76. These are the two stable positions in which the pivoting member can stably reside with no driving force from the magnetic core. In other words, the pivoting member, when joined to the spring structure, will remain in one position or the other with no electrical energy supplied to the MEMS cell. It is noted that the true stability points are a result of balanced forces on all the movable members in the system, and that depending on the details of the design, the stability points will not be exactly coincident with the intersection of the two arcs shown. Nevertheless, this approximation is useful in describing and understanding the function of the device.

The upper intersection 74 represents the as-manufactured (extended) state, in which the spring structure has no compression, tension, or strain from rotation. As the pivoting member rotates with respect to the substrate, the angular trajectory about the hinge attachment post is accommodated by the compliant C-spring portion of the spring structure. The C-spring is a rectangular kink in the structure connecting the pivoting member to the spring attachment post. This kink can compress and rarify in response to the arc of travel of the pivoting member.

As the pivoting member begins to move from the as-manufactured extended position, the spring structure will rotate and compress at the C-spring. The restoring force of the C-spring creates an energy barrier between the two stable positions. As the pivoting member rotates further, the C-spring goes through a compression maximum and then at least partially decompresses. The dimensions of the C-spring determine the stiffness and therefore the energy barrier between the stable positions. The amount of compressive force can be manipulated by design, for example by moving the position of spring attachment post, or by changing the aspect ratio or thicknesses of the C-spring elements. It will be clear to one skilled in the art that many variations of this embodiment can be envisioned without departing from the spirit and scope of this invention, depending on the throw, torques, voltages and other design aspects of a particular application.

Figure 2C:
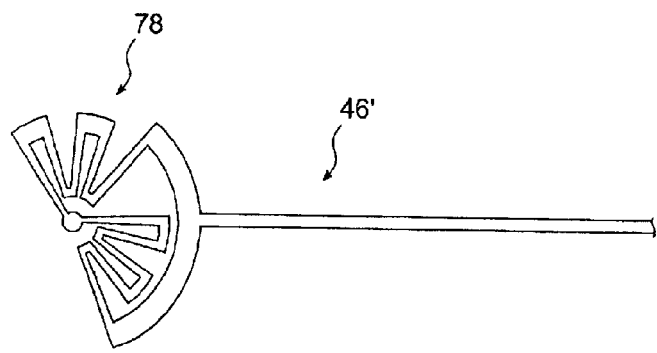
FIG. 2C is a simplified top view of a spring pivot according to another embodiment of the present invention.

The pivot/spring system forms the "latch", which latches the utilitarian feature in either of the two stable positions, either extended or retracted. Upon cessation of the driving current, the pivoting member will remain in the chosen stable position. FIG. 2C is a simplified top view of a spring structure 46' according to another embodiment of the present invention. An accordion-shaped pivot 78 replaces the clamshell pivot shown in FIG. 2A. The accordion-shaped pivot provides high angular compliance and high radial stiffness, but is more complex in design than the clam-shell pivot. Additional embodiments for pivots with high radial stiffness will be clear to those skilled in the art, based on this concept of a monolithic bearing which allows essentially free rotation through an arc of travel at least about 30 degrees, but substantially less than 360 degrees.

VI. Position Sensing

Figure 3A:
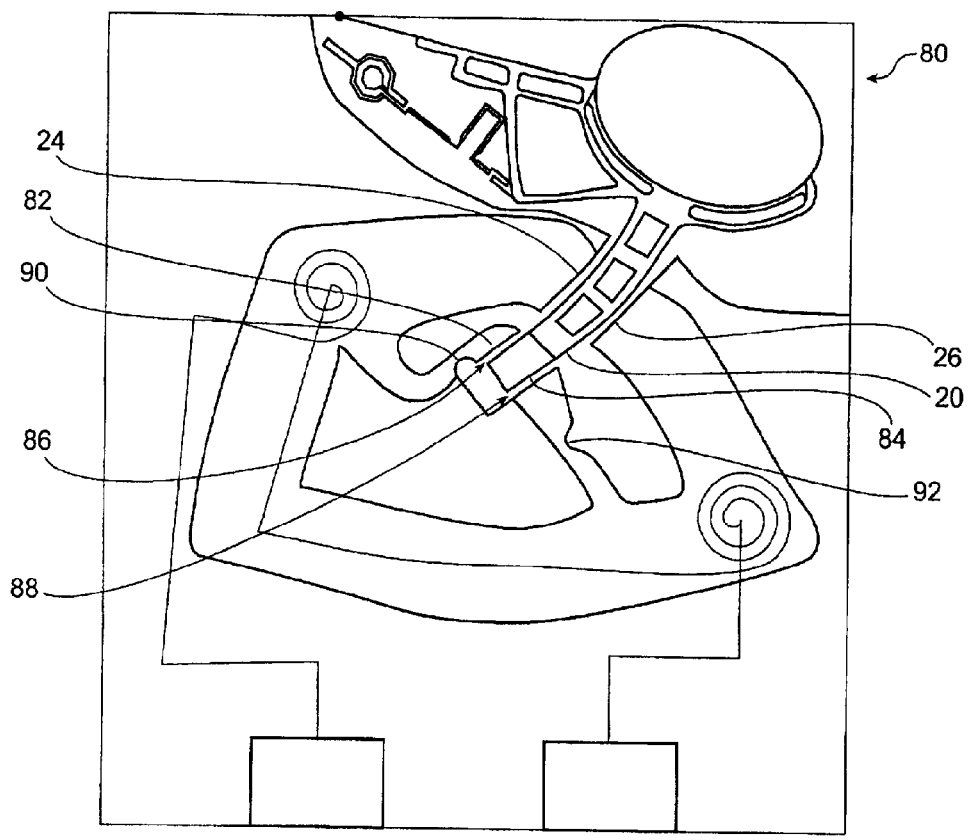
FIG. 3A is a simplified top view of a MEMs cell with sensing poles according to another embodiment of the present invention.

FIG. 3A is a simplified top view of a MEMS cell 80 according to a further embodiment of the present invention. Sensing poles 82, 84 are patterned in the superstrate and deposited with iron-nickel alloy similarly to the drive poles 24, 26 for convenience. However, the sensor poles may be of a different material in order to optimize separately the magnetic properties and performance of the actuator magnetic circuit and the sensing magnetic circuit.

Whether the magnetic tab 20 is between the sensing poles 82, 84 can be determined by measuring the inductance of the magnetic circuit formed by the drive coils 24, 26, bridges 30, 32, 34, cores 35, 37, sensing poles 82, 84, and magnetic tab 20. Hence, the position of the pivoting element can be determined. In an alternative embodiment, the sensing poles are omitted and there is a sufficient difference in inductance between the retracted position and the extended position to sense the position of the pivoting member. However, a more precise measurement can be made by providing the magnetic sensing circuit illustrated. In an alternative embodiment, the magnetic sensing circuit is used to provide a feedback signal to selectively position the pivoting member throughout a range of rotation using a permanently magnetized material on the magnetic tab and an opposing spring.

When current is applied to the coils 26, 28 a magnetic flux path is established between the sensor pole 82 across a narrow gap 86 to the magnetic tab 20, across the adjacent narrow gap 88 between the tab and to the adjacent sensor pole 84. Each sensing pole is shaped with a narrowed portion 90, 92 designated the "pinch" region. The function of the pinch region is to limit the magnetic flux flowing through the sensor poles. When the cell is toggled from one position to another, the pinch regions become magnetically saturated and the reluctance of the magnetic circuit rises. Saturation of the sensor pole structure assures that most of the flux is carried by the major actuator poles, in order to maximize the torque of the actuator during operation. The sensor poles also exert a force on the rotating member when the switching circuit is energized, and this additional force can be used to offset or fine-tune the behavior of the overall actuator. Tuning of this force can be accomplished by adjusting the width of the pinch region.

For the preferred embodiment, the width of the pinch region is on the order of 10%–30% of the width of the sensor poles 82, 84. In general, the width of the pinch will depend on the accuracy needed for the measurement. A narrower pinch provides a more sensitive measurement, but with a smaller dynamic range.

Figure 3B:
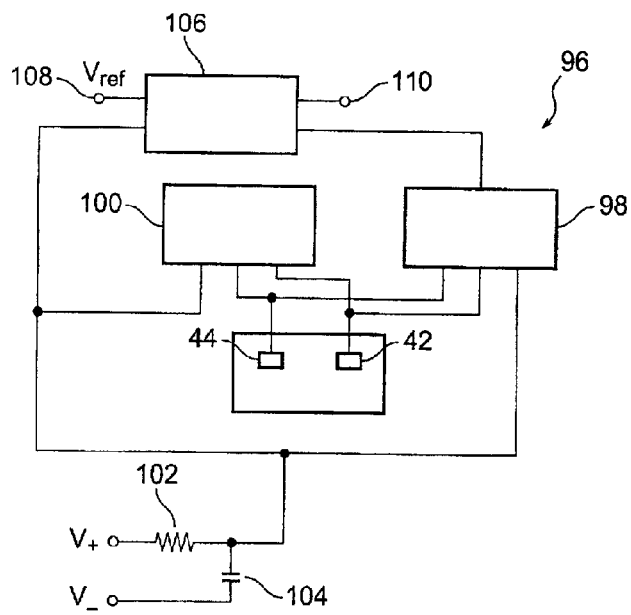
FIG. 3B is a simplified diagram of an actuating and measurement system according to an embodiment of the present invention.

FIG. 3B is a simplified diagram of a circuit 96 for toggling the MEMS switch between states and for measuring the inductance of the sensing circuit, hence determining the position of the MEMS switch. An inductance comparator 98 connected to the coils of the MEMS cell through the bonding pads 42, 44 performs the measurement by applying a small oscillatory signal from the frequency generator 100 to the magnetic sensing circuit, and measures the difference in the inductance with the rotating member in the retracted versus the extended position. The measurement frequency is chosen to maximize the distinction between the two positions. A high frequency, typically several MHz, measurement minimizes the contribution of the major actuator poles to the inductance reading by tuning out this larger structure.

Power is supplied through a resistor 102 and capacitor 104 to the coils of the device, as well as to the electronic functional blocks the switch comparator 106 inductance comparator 98 and frequency generator 100. Also supplied to the comparator is a reference signal 108 representing the desired state of the rotating member (retracted or extended). The comparator 106 provides an output 110, typically a high or low voltage, indicating the state of the switch. The output signal is generated by comparing the measured inductance of the magnetic sensing circuit to the reference. This reveals the state of the device as being either in the retracted position or the extended position.

The inductance comparator monitors the inductance in the magnetic sensing circuit. A large inductance value is measured when the pivoting member and magnetic tab are in the retracted position (see FIG. 1A). However when the rotating member is in the extended position (see FIG. 1B), the magnetic tab is absent from the gap, creating a larger magnetic reluctance in the magnetic circuit, and a correspondingly low inductance as measured by the inductance comparator.

Figure 3C:
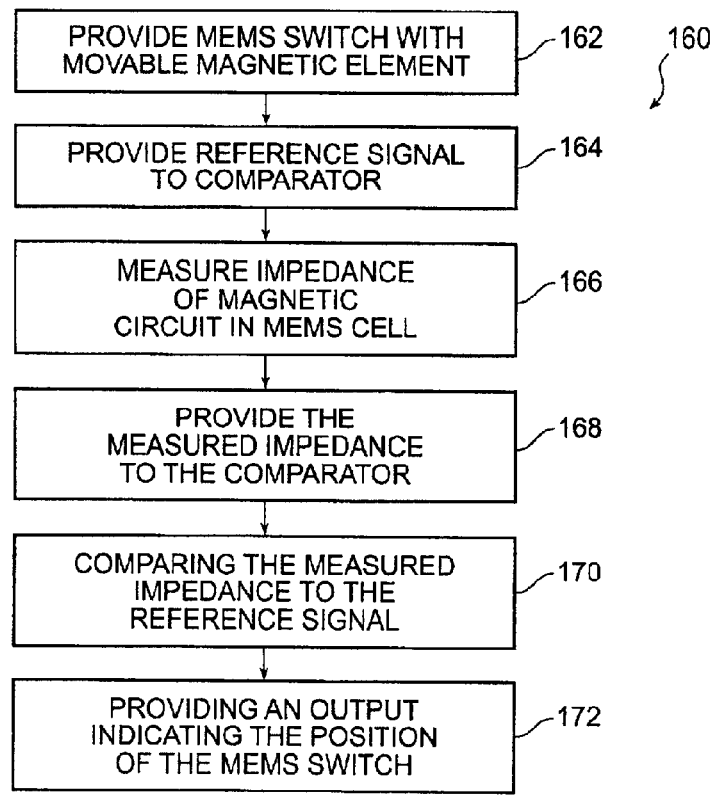
FIG. 3C is a simplified flow diagram of a process of sensing the position of the movable element of a MEMs cell according to another embodiment of the present invention.

FIG. 3C is a simplified flow chart of a method 160 for sensing the position of a MEMS switch according to an embodiment of the present invention. A MEMS switch is provided with a magnetic circuit and a movable magnetic element (step 162) capable of being switched from a first position to a second position and disposed to alter the impedance of the magnetic circuit according to the position of the movable magnetic element. Providing a reference signal to a comparator (step 164), measuring the impedance of the magnetic circuit (step 166) and providing the measured impedance to the comparator (step 168). Comparing the measured impedance with the reference signal (step 170) and providing an output (step 172) indicating the position of the movable magnetic element, and hence the switch position or state. As discussed above, the impedance measurement can be an inductance. In a further embodiment, the magnetic circuit includes a first actuator pole, a second actuator pole, a first sensor pole, and a second sensor pole. In a yet further embodiment, a first pinch region is disposed between the first sensor pole and the first actuator pole, and a second pinch region is disposed between the second sensor pole and the second actuator pole.

VII. Fabrication of a Low-Inertia Mirror

When MEMS cells are used in an optical switching application, fast switching speeds are generally preferable to slow switching speeds. Similarly, it is generally more desirable to switch states with less power, rather than with more. These objectives can be met by lowering the inertia (mass and/or lever arm) of the pivoting member. One way to lower the mass is to make a smaller movable structure. For example, if the mirror is an oval with axis of 1,100×1,560 microns, reducing the oval to 550×780 microns is one way to reduce the mass. However, it may be desirable to maintain the larger mirror size to aid alignment of the MEMS cell to other optical elements or to reduce the insertion loss of an optical signal reflecting off the mirror.

Alternatively, the mirror could be thinned, for example from about 40 microns to about 20 microns. Thinning would reduce the mass of either mirror; however, excessive thinning of the larger mirror reduces mirror stiffness, which can allow distortion of the mirror to occur, resulting from residual stresses from the manufacturing process or stresses arising from changes in the ambient temperature, or even shock and vibration.

Figure 4A:
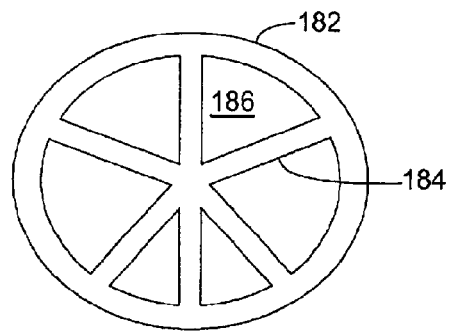
FIG. 4A is a simplified bottom view of a lightened and reinforced mirror according to an embodiment of the present invention.

FIG. 4A is a simplified bottom view of a reinforced mirror structure 180 according to an embodiment of the present invention. Ribs 182, 184 stiffen the thinner mirror segments 186. A radial spoke pattern of ribs with a circumferential rib is illustrated, but several other patterns are possible. In a particular embodiment, the ribs are about 40 microns thick (essentially the initial thickness of the superstrate), and the thinned segments are about 20 microns thick, although the second number may be selected according to many variables, as those skilled in the art will understand. Finite element analysis can be used to model the mirror structure to arrive at suitable configurations and thickness.

Figure 4B:
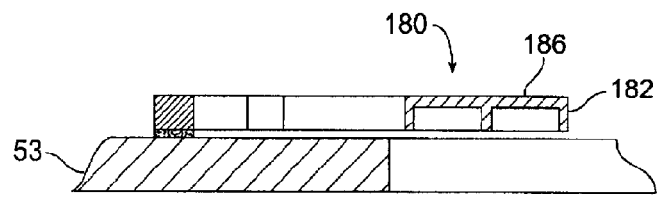
FIG. 4B is a simplified cross section of a MEMs cell with a lightened and reinforced mirror according to another embodiment of the present invention.

FIG. 4B is a simplified cross section of the reinforced mirror structure 180 illustrated in FIG. 4A. A contiguous field of the substrate 53 has been removed from beneath the mirror structure to provide access to the backside of the mirror. The circumferential rib 182 and other ribs have been formed by lithographic processes. The dimensions of the features are relatively large, so a non-contact exposure method of resist is acceptable. For example, the pattern can be directly written on backside resist with an electronic beam or a focused optical exposure method can be used with photoresist.

Alternatively, the backside reinforcing pattern can be achieved by removing the substrate in the pattern of the thinned sections, washing out the oxide layer overlying the sections to be thinned, and then thinning the selected regions of the superstrate. The ribs may be thin enough to allow undercutting to free the mirror structure, or perforations in the underlying substrate beneath the ribs in accordance with the procedures described in association with FIG. 1D may be provided with intermediate masking steps.

VIII. Exemplary Optical Switching Arrays

Figure 5A:
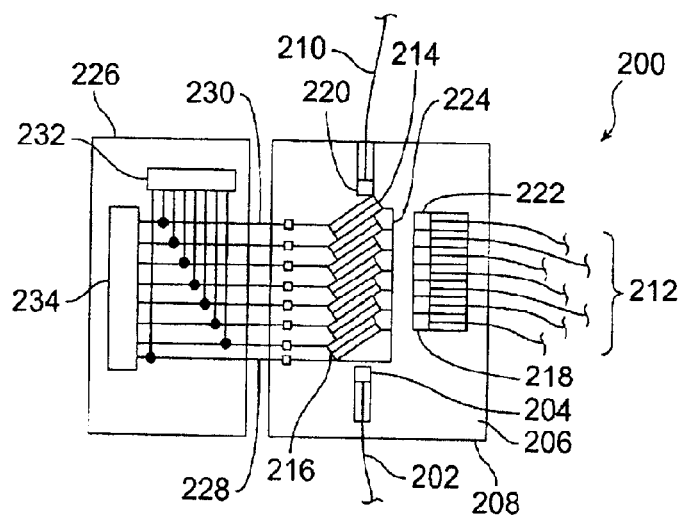
FIG. 5A is a simplified top view of a 1×8 optical switching array and associated circuitry according to an embodiment of the present invention.

FIG. 5A is a simplified top view of a 1×8 optical switching array 200 according to an embodiment of the present invention. An input fiber 202 provides an optical signal to a collimator 204, such as a graded-index ("GRIN") lens. The collimator expands the light signal from the end of the fiber to an essentially parallel light beam that travels along an optical axis essentially parallel to the major surface 206 of the mounting substrate 208 of the array. The collimator can be integrated with the fiber, such as assemblies available from NSG America, Inc., of Somerset, N.J. sold under the trade name SELFOC®.

Using Gaussian beam optical modeling for an 8×8 and a 16×16 optical cross connects ("OXC") and a 1.0 mm SEL-FOC® lens, less than 0.2 dB insertion loss for all optical paths for the 8×8 OXC and less than 0.5 dB for the 16×16 OXC is expected for MEMS cells with an essentially elliptical mirror of about 550×80 microns. It is expected that some additional loss will occur due to alignment errors and other factors, but that the worst case insertion loss through any path of the 16× OXC will be less than about 2.5 dB. It is desirable that the mirror has a minimum dimension greater than about 400 microns in order to reflect the Gaussian beam, and thus achieve low insertion loss.

In one embodiment, the mounting substrate 208 serves as a miniature optical bench and the fiber/collimator assemblies are held in grooves formed in fiber mounting blocks that hold the fibers at the proper height above the surface of the substrate for optically coupling to the raised mirrors. The fiber mounting blocks are made of a material with a similar coefficient of thermal expansion to reduce thermal alignment sensitivity and thermally induced stresses. In a particular embodiment, the OXC substrate and fiber mounting blocks are both silicon. In a further embodiment, either or both are poly-crystalline silicon ("poly-silicon").

The array includes a through path to one output fiber 210 and seven reflective paths to seven other output fibers 212 depending on which, if any, of the mirrors of the switching cells 214 are "high" (extended as shown in FIG. 1B). For example, if the first cell 216 was high, the mirror in the cell would reflect the optical signal from the input collimator 204 to the first reflective output collimator 218. If the mirror is not high, then the optical beam proceeds to the next cell, and eventually to the though output collimator 220 if no mirrors were raised in the optical beam path from the input collimator. Thus, the input signal can be routed to any one of the eight output fibers.

In a particular embodiment, the mirrors are raised and lowered normal to the major plane of the mounting substrate by rotating the mirrors about a flexure pivot hinge, as discussed in association with FIG. 1A and elsewhere. The flexure pivot helps to maintain the mirror in the desired vertical orientation to the mounting substrate and provides stiffness to resist effects arising from mechanical shock and vibration. Each of the cells is activated by applying an electric pulse to an individual magnetic drive on each cell.

The mirror achieves high reflectivity because the mirror surface is formed by chemically etching a major crystal plane (e.g. 111, 100, or 110) of the substrate from which the MEMS cells are formed, thus the mirrors are essentially atomically flat. Additionally, a reflective metal layer can be deposited on the exposed surface of the mirror to achieve not only a very smooth surface, typically optically flat for wavelengths of about 1.5 microns, but also a highly reflective mirror, typically at least about 96% but preferably greater than 97%.

However, even with such high quality mirrors, some variation between mirrors arises. Embodiments of the present invention allow selecting higher quality mirrors for the more critical signal paths. For example, the first reflective collimator 218 has a shorter path length to the input collimator 204 than the seventh reflective collimator 222, making the first reflective path more sensitive to mirror quality. Thus, in one embodiment of the present invention the optical switching array has a first mirror with a first mirror quality and a second mirror with a second mirror quality. The position of the first and second mirrors in the switching array is selected according to the first and second mirror quality. In a further embodiment, the die with the higher-quality mirror is to be placed closest to the input collimator.

Similarly, each mirror can be individually aligned to a single pair of optical fibers (i.e. the input fiber and one output fiber). This individual alignment allows optimizing switch characteristics, such as insertion and polarization-dependent losses ("PDL"). Optimization can be achieved by moving one fiber (typically the output fiber) relative to the mirror associated with that output path, or, by moving the mirror. In the first instance each output fiber would need the ability to be moved in order to align it to the input fiber and the mirror associated with each of the respective output paths. Also, the alignment of the first fiber to the mirror might be a compromise, or "best guess", relating to each of the plurality of output paths. It is understood that optical switches are often reciprocal devices, and thus the terms "input" and "output" are used for purposes of discussion only.

In the second case, the mirrors can be moved along the surface of the substrate (x- and y-axis), as well as rotated. In some embodiments, the fibers may be pre-aligned on a fiber block that is attached to the mounting substrate, and in other embodiments one or both of the fibers (i.e. input and output) may be aligned to the associated mirror(s). It is generally desired that the mirror in each cell be vertical to the surface of the substrate in the "up" position, which is achieved during alignment with assembly tooling. This flexibility allows optimization of each path, rather than compromising the loss through one path with the loss through another path.

Various techniques for manipulating the individual cells exist. One technique uses micro-manipulators, such as piezo-electric actuators, to position the cell in the desired place on the substrate. Another technique uses bursts of laser light or other particles or energy to nudge the cell into the desired position, or a combination of techniques can be used. Alignment techniques typically use an optical source providing an optical signal to one port, while a photo-detector measures the output at the other port, commonly known as "active alignment". The components in the optical path are manipulated until the desired transmission characteristic between the source and the detector is obtained.

The MEMS cell described in accordance with FIG. 1A can be mechanically toggled, as well as electro-magnetically toggled. The mirror might be raised as part of a device testing process using probes to provide an electronic control signal to the cell, for example. The OXC can then be fabricated from MEMs cells with raised mirrors. After alignment of a cell, the mirror can be pushed down out of the way to allow alignment of the next cell without providing a control signal. The latching spring of the cell will retain the mirror in the lowered position. Thus, the entire array can be aligned without having to provide electronic switching signals to the cells.

The cell might be moved on a liquid layer, of solder or eutectic for example, that is cooled to a solid after positioning the cell on the substrate to secure the cell in place. The temperature of each cell-substrate interface can be controlled so that the previously aligned cells don't float away on a re-melted interface layer. Unlike conventional MEMS optical switching arrays that fabricate and/or align the entire array in a single operation, each cell of arrays according to the present invention can be pre-tested to ensure that the cell is good before it is assembled into the array. Thus, redundancy in the array is not required to account for die yield loss; however, the array may include redundancy for other reasons, such as field failures of a die in the array.

The mounting substrate 208 has a printed wiring diagram 224 for providing electrical connections to the MEMS cells. After the MEMS cell array is assembled, wire bonding or similar techniques are used to electrically couple the cells to a control circuit 226 or circuits. Each cell has a common line 228 and a signal line 230. A single signal line is possible because of the nature of the magnetic drive that allows switching from either state using the same pulse. Other MEMS devices may require different pulses for switching from different states (e.g. a positive pulse to switch in one direction and a negative pulse to switch in the other) or may have additional control lines. The control circuit provides electric signals from an electric signal source 232 (only two of which are shown for simplicity of illustration) to the MEMs cells.

In one embodiment, the electric signal is an electronic pulse provided to the desired MEMS cell to toggle the mirror between a raised and lowered position. In a further embodiment, a sense circuit 234 can determine the state (mirror position) of the associated cell. The sense circuit can be integrated with the control circuit, or be a separate circuit.

Figure 5B:
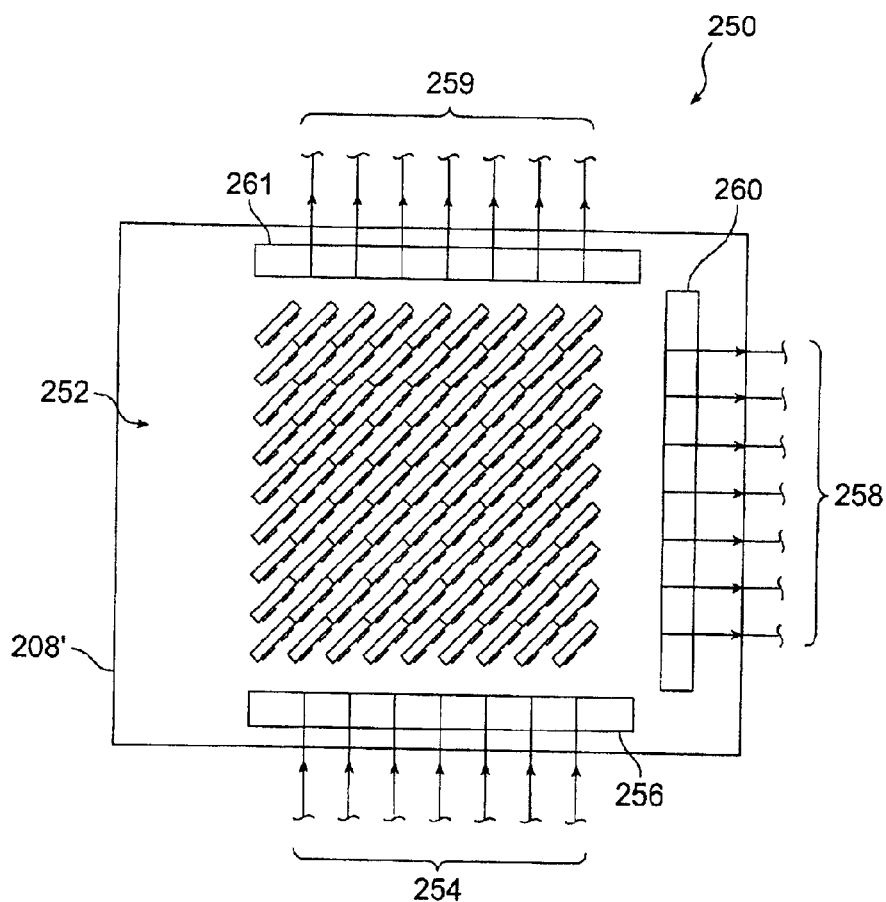
FIG. 5B is a simplified top view of an 8×8 optical switching array according to another embodiment of the present invention.

FIG. 5B is a simplified top view of a portion of an 8×8 (N=8) optical cross connect switching array 250 according to another embodiment of the present invention. The array has 64 ($N^2$) cells (dice) 252 to allow each of the inputs to be switched to any of the outputs; however, the array does not have to be square, in other words, an array may be N×M. One set of optical fibers 254 is mounted in a fiber mounting block 256 with collimators (not shown in this illustration) to expand the light carried on a fiber into an essentially parallel light beam. This set of fibers 254 will arbitrarily be referred to as the input fibers for purposes of discussion. Control and sensing lines are not shown for clarity of illustration, but generally are formed on the mounting substrate 208' using conventional printed wiring substrate techniques.

A second set of fibers 258, which will be called the switched output fibers, is mounted in a second fiber mounting block 230. The N×N array of MEMs cells allows directing the light beam from any of the eight input fibers to any of the eight output fibers. In order to switch from any array state (configuration) to any other array state, a maximum of 16 (2N) switching signals (pulses) would need to be provided to the array. For example, only one mirror along the optical path from an input collimator would be raised in order to direct the input signal to one of the outputs. To switch that signal to another output would require, at most, lowering the raised mirror and raising another mirror. Similarly, each of the other input signals could be switched from one output to another output using at most two pulses—one to lower the currently raised mirror, and one to raise the desired mirror. Thus, the entire array could be re-configured with only 16 pulses. Of course, some paths might not be changed and no pulses would be required for those paths. The number of pulses needed to re-configure the array is generally a measure of the power required to re-configure the array.

A third set of fibers 259, which will be called the through output fibers, is mounted in a third mounting block 261, generally with collimators or other optics associated with each fiber to collect the light from the opposite input fiber when no mirror in that path is raised. This third set of fibers can be omitted in some embodiments, depending on the anticipated application of the OXC. However, in some applications this third set of fibers is desirable because most optical signals carried on the input fibers will typically not be switched, and this third set of fibers provides convenient through paths for most of the optical signals most of the time.

As with the 1×8 switching array discussed in reference to FIG. 5A, above, the dies in the 8×8 or other arrays can be sorted according to mirror quality, and selectively placed in the array. In particular, the collimators on the input fibers typically have an optimum "throw" distance in which, generally speaking, the optical beam from the collimator has the smallest cross section, commonly referred to as the "beam waist". At longer distances, the beam expands from the waist.

It is generally desirable that the distance from an input collimator to a mirror of a switching die generally occur at the narrow portion of the beam waist so that most of the beam can be reflected off the mirror to a switched output, thus reducing insertion loss. However, in reference to FIG. 5B for example, one can see that not all paths from the inputs to the dice are of the same length, or that all switched paths from the input ports to the output ports are of the same length. While most of the paths from an input collimator to an output collimator fall within a reasonable range, such as about 24–26 mm for a 16×16 array (for a collimator that creates a beam waist at about 12–13 mm), some paths may be significantly longer or shorter. Placing dice with higher-quality mirrors in these paths provides an optical switching array with a lower insertion loss for the longer and shorter paths, which might otherwise increase because of the greater cross-section of the beam intersecting the mirror.

In a particular embodiment, a MEMS cell with a magnetic drive and an essentially elliptical mirror of about 550×780 microns according to FIG. 1A has a switching speed of about 200 microseconds. In another embodiment, a cell with an essentially elliptical mirror having diameters of about 1.0× 1.4 mm has a switching speed of less than 2 mS. The relatively large area of the mirrors allows the use of collimated free-space beams of light, thus one switching cell can be placed "behind" another and so forth. The magnetic motor provides a relatively high motive force to switch the mirror in a short amount of time.

Since the MEMS cell described above in reference to FIG. 1A is a true latching device (compared to switch and hold devices that require an applied voltage to hold), the cell only consumes power during the switch cycle. Each magnetic actuator draws about 1 W over a period of about 1 mS to switch states, or about 1 mJoule of energy is required to switch states. If a SONET-type switching application allows a 50 mS switching period, then the average power consumed over the SONET switching period is only about 1/50 W.

For example to provide a worst-case 8×8 cross-connect reconfiguration (2N pulses) has an instantaneous draw (peak power load) of about 16 Watts, but an average power draw of only about a third of a Watt. Furthermore, since the power draw only occurs during the switch cycle, a power supply with a much lower average output can be used. For example, a power supply having a low rated output power used over a duty cycle of 10%, could accumulate power in a storage device, such as a capacitor, for the 90% down time, discharging the capacitor if additional peak power is required to implement a cross-connect configuration. Thus, the rated output power of the active power supply could be almost as low as the peak power load times the duty cycle, although additional capacity is typically provided.

Figure 5C:
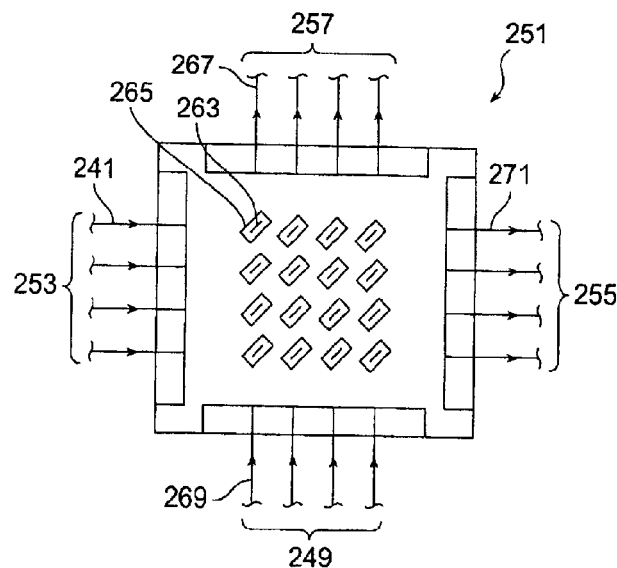
FIG. 5C is a simplified top view of a 4×4 ADD/DROP optical cross-connect according to yet another embodiment of the present invention.

FIG. 5C is an optical ADD/DROP cross connect 251 according to another embodiment of the present invention. The ADD/DROP cross connect has four sets of fibers and associated optics, which are shown as having equal numbers for each set; however, matching numbers of fibers are not required. For convenience of discussion, the first set of fibers 253 will be referred to as the input fibers, the second set of fibers 255 will be referred to as the output fibers, the third set of fibers 257 will be referred to as the DROP fibers, and the fourth set of fibers 249 will be referred to as the ADD fibers. Those skilled in the art will appreciate that, because of the reciprocal nature of the cross-connect, that different types of ports could be present on any of the sets of fibers. For example, the first set of fibers could include through ports corresponding to input ports in the opposite (second) fiber set, or ADD or DROP ports, depending on how the fibers from the cross connect are routed externally.

The optical cross connect includes a plurality of dice, in this instance 16 dice for a 4×4 cross connect, although the size of the array is merely exemplary. Each of the dice is capable of switching a double-sided mirror, as discussed above in relation to FIG. 1D. For example, in an ADD/DROP operation, an optical signal from an input fiber 241 is reflected off the raised double-sided mirror 263 of a MEMs die 265. The other mirrors in the optical beam path from the input fiber 241 are lowered. The optical signal is reflected to a DROP output 267. Concurrently, an ADD signal carried on an ADD fiber 269 is reflected to an output fiber 271. Of course, a signal could be dropped without another being added. Optical signals carried on other input fibers could similarly be dropped, with corresponding ADD signals being switched to the output fibers. In contrast to a simple ADD/DROP switch, the ADD/DROP cross-connect can route an optical signal from an input to any of a variety of DROP outputs while simultaneously adding a corresponding ADD signal to the through output.

A variety of operations may be achieved with the ADD/DROP array. For example, a payload on an input fiber can be routed to a drop fiber and another payload inserted from an add fiber. Similarly, the dropped signal can be re-inserted after processing, such as compensating for dispersion, amplification, or carrier-frequency (channel) shifting.

Figure 5D:
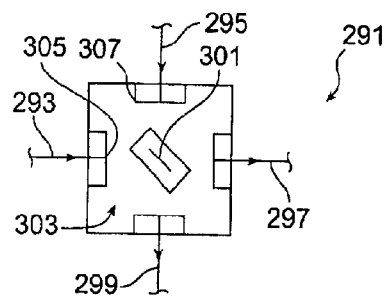
FIG. 5D is a simplified top view of a 2×2 optical switch that can be configured as an ADD/DROP switch.

FIG. 5D is a simplified top view of a 2×2 optical switch 291 that can be configured as an ADD/DROP switch. The switch includes a first input port 293, a second input port 295, a first output port 297 and a second output port 299. The switchable element 301 is a two-sided mirror that rotates about an axis essentially parallel to the major surface 303 of the optical switch. The switchable element is raised into and lowered out of the free-space optical beam paths from the input ports 305, 307. The optical switch can be used in an ADD/DROP switching application, for example. The two-sided mirror is relatively large, having a minimum dimension across its face(s) of about 550 microns. This allows efficient reflection of the optical beams from the collimators.

The first and second input ports provide free-space light beams with high isolation between ports. The switchable element is shown as having an angle of incidence to the input beam of about 45°, forming an angle of about 90° with the switched output, but could be placed in other orientations. In particular, the input beam could form a lower angle of incidence (closer to normal) to the mirror, to reduce polarization dependent loss, for example. In one embodiment the angle of incidence is about 15°, with the switched output port then forming an angle of about 30° with the input, in another, the angle between the input and switched output beams is about 45°. By mounting the MEMs die on its edge, its relation to the optical ports, which can also be moved about on the substrate prior to bonding, can be selected according to the desired application. Other MEMs devices have a relationship between the switch element and optical ports fixed by the fabrication process.

IX. Exemplary Assembly Process

Figure 6C:
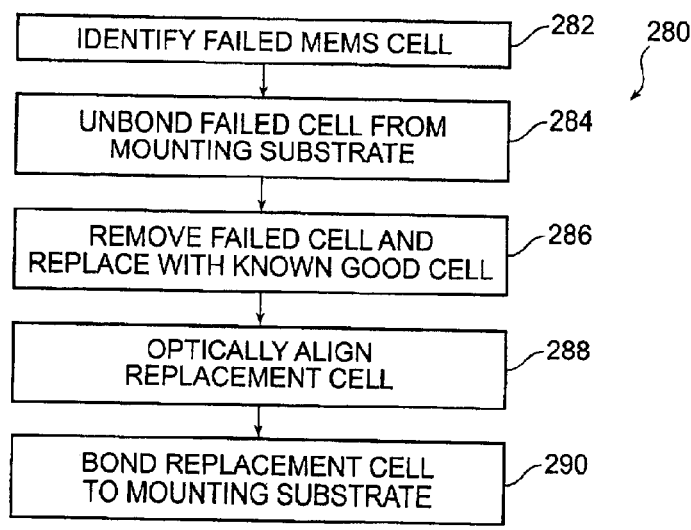
FIG. 6C is a simplified flow chart of a method of repairing an optical cross connect according to another embodiment if the present invention.
Figure 6A:
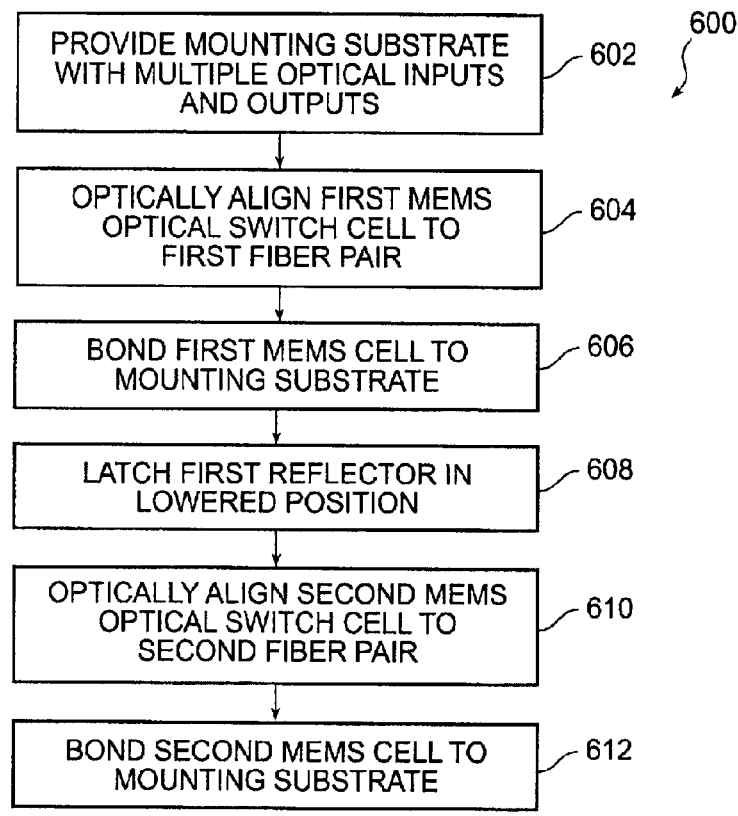
FIG. 6A is a simplified flow chart of a method for assembling an optical switching array according to an embodiment of the present invention.

FIG. 6A is a simplified flow chart of a method 251 for assembling an OXC according to an embodiment of the present invention. A mounting substrate with two optical inputs and two optical outputs is provided (step 253). A first MEMs cell with a first raised reflector is aligned to reflect a first light beam from the first optical input to the first optical output (step 255) and affixed to the mounting substrate (step 257). A second MEMs cell with a second raised reflector is aligned to reflect a second light beam from the second optical input to the second optical output (step 259) and affixed to the mounting substrate (step 263). In a particular embodiment, the first raised reflector is in the optical path from the second optical input to the second optical output and the first reflector is pushed to latch in a retracted position (step 261). In an alternative embodiment, an electronic control signal is provided to the first MEMs cell to retract the first reflector.

X. Array State Sensing

As discussed above in relation to FIG. 1C, the position of the optical switch can be determined by measuring the impedance of the magnetic drive circuit through the control lines. Thus, the state of each cell in the OXC can be determined without disrupting any optical signal path. Conventional array-state techniques often send an optical test signal down the input, and then query each of the optical outputs for the presence of the test signal. This is time-consuming and disrupts optical telecom transmissions.

Sensing the position of individual cells in an optical cross-connect switching array electronically, rather than using an optical technique, is desirable for several reasons. First, many switching nodes might be present between the optical test signal source and detector, and the absence of the expected optical signal at the detector would not necessarily identify which switching point was failing. Using an electric sensing method according to the present invention allows identification of the individual cell in a particular switching array (OXC) that is not in the desired state. This in turn could allow an operator at a remote location to send an electronic pulse to the identified cell to attempt to toggle the cell without affecting any other optical switch or path.

Similarly, a local sensing circuit combined with local logic circuitry could identify switching faults and even attempt automatic correction. For example, after receiving an array configuration command, a number of signals would be applied to specific cells to configure the optical cross-connect in a desired configuration. The array configuration could be expressed as a logic array, each cell in the array having a logic state (i.e. 1 or 0) associated with the mirror position (such as up or down). The logic circuitry operating in conjunction with the local sense circuitry could then check the state of each of the relevant cells and check it against the value for that cell in the logic array. If there is a discrepancy, the logic circuitry could then issue a pulse command to the discrepant cell to try and toggle the cell. The toggle operation is simplified in some embodiments of the present invention because the same pulse type is used to change from either state to the other. If the fault was not corrected, the local circuitry could then issue a fault notification to an operator, who could take any of several actions, such as re-routing the optical signal through another path and dispatching a repairman to repair or replace the faulty cross-connect.

Figure 6B:
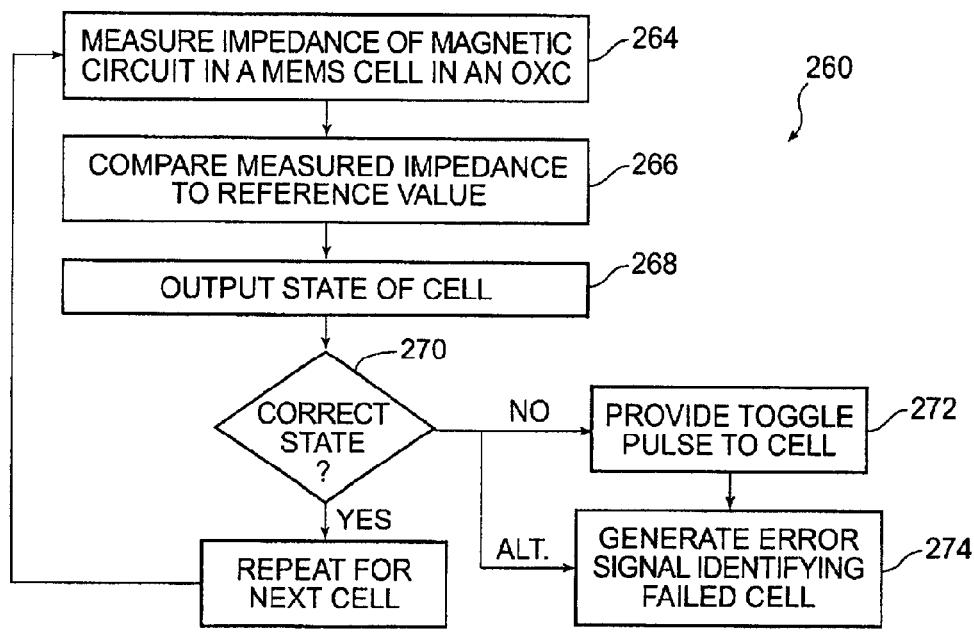
FIG. 6B is a simplified flow chart of a method of switching an optical signal in an optical switching array according to another embodiment of the present invention.

FIG. 6B is a simplified flow chart of a method for sensing an optical network configuration 260. In an OXC with a plurality of MEMS cells where each cell has a magnetic circuit, the impedance of the magnetic circuit of a cell is measured (step 264). It is understood that the cell may share a common line or contact, such as a ground contact, or may have additional control lines. The measured impedance is then compared to a reference value (step 266) to produce a cell state output (step 268). The cell state output is compared to an expected cell state (step 270). If the cell state output does not equal the expected cell state, a toggle pulse is provided to the cell (step 272). The impedance can then be measured again to determine if the cell has toggled to the correct state. If it has not, an error signal can be generated (step 274), including which cell in which array is not responding to the toggle pulses. In a further embodiment, the state of each of the cells in the OXC is sensed and compared against a cell state value in an OXC configuration table. In another embodiment, an error signal is generated after the re-try toggle pulse, even if the cell successfully toggles on the second try.

XI. Exemplary Repair Process

FIG. 6C is a simplified flow chart of a method 280 of repairing an OXC according to another embodiment of the present invention. In an OXC with a plurality of individually actuated MEMs cells bonded to a mounting substrate and configured to switch an optical beam from an optical input to any one of a plurality of optical outputs, identifying a MEMs cell that has failed (step 282). After the MEMs cell has been identified, unbending that cell from the mounting substrate (step 284), and replacing that cell with a new, known good cell (step 286). The new cell is optically aligned to reflect the optical beam from the input to one of the plurality of optical outputs (step 288), and then bonded to the mounting substrate (step 290).

While the preferred embodiments of the present invention have been illustrated in detail, it should be apparent that modifications, adaptations, and equivalents to the described embodiments might occur to one skilled in the art. For example, a prism or optic wedge might be used to direct optical beams in a switching operation without departing from the scope of the present invention as set forth in the following claims.

What is claimed is:

1. An optical switch comprising:

a mounting substrate a micro-electro-mechanical system ("MEMs") die mounted on an edge to the mounting substrate, the MEMs die including a mirror movably attached to a base portion of the MEMs die with a flexure hinge, the mirror moving from a first position to a second position in a plane essentially normal to a major surface of the mounting substrate;

an input port disposed to couple an optical signal to
 a first output port when the mirror is in the first position and to couple the optical signal to
  a second output port when the mirror is in the second position wherein the mirror is formed on a smoothed major crystal plane of a layer of single-crystal silicon and has a reflectivity greater than 96%.

2. The optical switch of claim 1 wherein the input port provides the optical signal to the mirror in the second position at an angle of between about 15–45 degrees from a normal of the mirror.

3. The optical switch of claim 1 wherein the input port provides the optical signal to the mirror in the second position at an angle of less than about 22.5 degrees from a normal of the mirror.

4. An optical switch comprising:
   a mounting substrate
   a micro-electro-mechanical system ("MEMs") die mounted on an edge to the mounting substrate, the MEMs die including a mirror rotatably attached to a base portion of the MEMs die with a flexure hinge, the mirror rotating from a first position to a second position in a plane essentially parallel to a major surface of the MEMs die;
   an input port disposed to couple an optical signal to
      a first output port when the mirror is in the first position and to couple the optical signal to
         a second output port when the mirror is in the second position, wherein the mirror has a first mirrored surface and a second mirrored surface, the second mirrored surface being opposite the first mirrored surface, and further comprising
            a second input port disposed to optically couple a second optical signal to the first output port when the mirror is in the second position.

5. A micro-electro-mechanical system ("MEMs") optical cross connect comprising:
   a mounting substrate having a mounting surface;
   a first MEMs optical switch cell affixed to the mounting surface on an edge of the first MEMs optical switch cell and aligned to direct a first optical beam propagating along a beam path from a first optical input to a first optical output when a first metallic mirror of the first MEMs optical switch cell is in the beam path; and
   a second MEMs optical switch cell affixed to the mounting surface and aligned to direct the first optical beam from the first optical input to a second optical output when a second metallic mirror of the second MEMs optical switch cell is in the beam path and the first optical switching element is rotated in a plane essentially normal to the mounting surface out of the beam path wherein at least one of the first metallic mirror and the second metallic mirror has a minimum face dimension greater than about 400 microns.

6. The MEMs optical cross connect of claim 5 wherein the metallic mirror has an oval shape of about 550 microns by about 780 microns.

7. The MEMs optical cross connect of claim 5 wherein the metallic mirror has an oval shape of about 1.0 mm by about 1.4mm.

8. A micro-electro-mechanical system ("MEMs") optical cross connect comprising:
   a mounting substrate having a mounting surface;
   a first MEMs optical switch die having a major surface and an edge, the first MEMs optical switch die being affixed to the mounting surface on the edge and aligned to direct a first optical beam propagating along a beam path from a first optical input to a first optical output when a first optical switching element of the first MEMs optical switch die is in the beam path; and
   a second MEMs optical switch die affixed to the mounting surface and aligned to direct the first optical beam from the first optical input to a second optical output when a second optical switching element of the second MEMs optical switch die is in the beam path and the first optical switching element is rotated in a plane essentially parallel to the major surface of the first MEMs optical switch die out of the beam path, wherein the first optical switching element is a two-sided mirror having a first mirrored side and a second mirrored side, the first optical beam reflecting off the first mirrored side of the two-sided mirror when the two-sided mirror is in the beam path and further comprising
      a second optical input disposed to provide a second optical beam to the second mirrored side of the two-sided mirror when the two-sided mirror is in the beam path, the second optical beam being reflected off the second mirrored side to
         a third optical output wherein the first optical beam optically couples to the third optical output when the first optical element and the second optical element are both switched out of the beam path.

9. A micro-electro-mechanical system ("MEMs") optical cross connect comprising:
   a mounting substrate having a mounting surface;
   a first MEMs optical switch cell affixed to the mounting surface on an edge of the first MEMs optical switch cell and aligned to direct a first optical beam propagating along a beam path from a first optical input to a first optical output when a first optical switching element of the first MEMs optical switch cell is in the beam path; and
   a second MEMs optical switch cell affixed to the mounting surface and aligned to direct the first optical beam from the first optical input to a second optical output when a second optical switching element of the second MEMs optical switch cell is in the beam path and the first optical switching element is rotated in a plane essentially normal to the mounting surface out of the beam path
   wherein the first optical switching element is a two-sided mirror having a first mirrored side and a second mirrored side, the first optical beam reflecting off the first mirrored side of the two-sided mirror when the two-sided mirror is in the beam path and further comprising
      a second optical input disposed to provide a second optical beam to the second mirrored side of the two-sided mirror when the two-sided mirror is in the beam path, the second optical beam being reflected off the second mirrored side to
         a third optical output wherein the first optical beam optically couples to the third optical output when the first optical element and the second optical element are both switched out of the beam path
   wherein the first mirrored side has a reflectivity greater than 96% and the second mirrored side has a reflectivity greater than 96%, each of the first mirrored side and the second mirrored side being formed on a smoothed major crystal plane of a layer of single-crystal silicon.

10. A micro-electro-mechanical system ("MEMs") optical cross connect comprising:
   a mounting substrate having a mounting surface;
   a first MEMs optical switch cell affixed to the mounting surface on an edge of the first MEMs optical switch cell and aligned to direct a first optical beam propagating along a beam path from a first optical input to a first optical output when a first optical switching element of the first MEMs optical switch cell is in the beam path; and
   a second MEMs optical switch cell affixed to the mounting surface and aligned to direct the first optical beam from the first optical input to a second optical output when a second optical switching element of the second MEMs optical switch cell is in the beam path and the first optical switching element is rotated in a plane essentially normal to the mounting surface out of the beam path wherein the first optical input is disposed between 12–57 mm from the first optical output.

11. A micro-eletro-mechanical system ("MEMs") optical cross connect comprising:

a mounting substrate having a mounting surface;

a first MEMs die mounted on a first edge to the mounting surface and having a first mirror disposed to rotate in a plane essentially normal to the mounting surface and extending at least about 400 microns above a second edge of the first MEMs die when the mirror is in a first position and being retracted below the second edge of the first MEMs die when the first mirror is in a second position, the first mirror reflecting a first optical beam from a first optical input to a first optical output when the first mirror is in the first position, the first optical beam coupling to a second optical output when the first mirror is in the second position; and a second MEMs die mounted on a third edge to the mounting surface and having a second mirror disposed to rotate in a plane essentially normal to the mounting surface and extending at least about 400 microns above a fourth edge of the second MEMs die when the mirror is in a third position and being retracted below the fourth edge of the second MEMs die when the second mirror is in a fourth position, the second mirror reflecting the first optical beam front the first optical input to a third optical output when the second mirror is in the fourth position and the optical beam coupling to the second optical output when the first mirror is in the second position and the second mirror is in the fourth position, the first optical input being separated from the second optical output by about 12–57 mm.

12. The optical cross connect of claim 11 wherein the first mirror is a two-sided mirror and further comprising a second optical input wherein the first mirror reflects a second optical beam from the second optical input to the second optical output when the first mirror is in the first position.

13. A micro-electro-mechanical system ("MEMs") optical cross connect comprising:

a mounting substrate having a mounting surface;

a first latching MEMs optical switch cell affixed to the mounting surface and aligned to direct a first optical beam from a first optical input to a first optical output when a first mirror of the first MEMs optical switch cell is latched in an extended position; and a second MEMs optical switch cell affixed to the mounting surface and aligned to direct the first optical beam from the first optical input to a second optical output when a second mirror of the second MEMs optical switch cell is latched in a second extended position and the first mirror is rotated in a plane essentially normal to the mounting surface out of the beam path to latch in a retracted position wherein the first mirror in the extended position extends above an edge of the first latching MEMS optical switch cell at least 400 microns.

14. An optical cross connect comprising:

N optical input ports where N is a first integer;

M optical output ports where M is a second integer; and

N times M micro-electro-mechanical system optical switch dice, each of the micro-electro-mechanical system optical switch dice having a magnetic drive capable of switching a mirror from a first position to a second position in response to a switching signal provided to the micro-electro-mechanical switch die wherein the switching signal has a maximum voltage less than 10 Volts.

15. An optical cross connect comprising:

N optical input ports where N is an integer;

N optical output ports where; and

N times N micro-electro-mechanical system optical switch dice, each of the micro-electro-mechanical system optical switch dice having a drive capable of switching a mirror from a first position to a second position in response to a switching signal provided to the micro-electro-mechanical switch die wherein the optical cross connect switches 2N optical switch dice in less than about 50 mS with an average power consumption of less than about 2N/50 Watts.

16. A method for operating an optical cross connect, the method comprising:

measuring an impedance of a first circuit of a first optical switch in the optical cross connect;

comparing the impedance to a reference value to determine a switch state of the first optical switch;

providing a switch state output; and comparing the switch state output to an expected switch state.

17. The method of claim 16 further comprising a step, after the comparing the switch state output, if the switch state output is not the expected switch state, of providing a switching signal to the first optical switch.

18. The method of claim 16 further comprising a step, after the comparing the switch state output, if the switch state output is not the expected switch state, of generating an error signal identifying the first optical switch in the optical cross connect.

19. The method of claim 18 further comprising a step of, after the comparing the switch state output, if the switch state output is the expected switch state, measuring a second impedance of a second circuit of a second optical switch in the optical cross connect.

20. A method for operating an optical cross connect having a plurality of optical switches, each of the optical switches having a magnetic drive, the method comprising:

measuring an impedance of a first circuit of a first optical switch in the optical cross connect;

comparing the impedance to a reference value to determine a state of the first optical switch;

providing a switch state output; and comparing the switch state output to an expected switch state; and, if the switch state output is not the expected switch state, providing a switching signal to the first optical switch.

21. A method for operating an optical cross connect having a plurality of optical switches, each of the optical switches having a magnetic drive, the method comprising:

measuring an impedance of a first circuit of a first optical switch in the optical cross connect;

comparing the impedance to a reference value to determine a state of the first optical switch;

providing a switch state output; and comparing the switch state output to an expected switch state; and, if the switch state output is not the expected switch state, providing a switching signal to the first optical switch; and generating an error signal identifying the first optical switch in the optical cross connect.

22. A method of determining a configuration of an optical cross connect having N optical inputs, M optical outputs, and N×M optical switching cells where N and M are integers, the method comprising:

measuring an impedance for each of the N×M optical switching cells;

comparing the measured impedance of each of the N×M optical switching cells against a reference value; and generating a switch state signal for each of the N×M optical switching cells.

23. The method of claim 22 further comprising steps of:

comparing each of the switch state signals against a corresponding expected switch state; and, if an optical switching cell is not in an expected state, generating an error signal identifying the optical switching cell that is not in the expected state.

24. A method of operating an optical cross connect, the method comprising:

providing a plurality of electronic control signals to a plurality of micro-electro-mechanical system optical switch dice in the optical cross connect to configure the optical cross connect to a selected configuration;

removing electrical input to the optical cross connect; and maintaining the selected configuration.

* * * * *

UNITED STATES PATENT AND TRADEMARK OFFICE
CERTIFICATE OF CORRECTION

PATENT NO. : 6,785,038 B2
DATED : August 31, 2004
INVENTOR(S) : Hichwa et al.

It is certified that error appears in the above-identified patent and that said Letters Patent is hereby corrected as shown below:

Column 9,
Line 22, "starts at to the" should read -- starts at $t_o$ the --.

Column 20,
Line 31, "unbending" should read -- unbonding --.

Column 23,
Line 35, "beam front" should read -- beam from --.

Signed and Sealed this

Fourth Day of October, 2005

JON W. DUDAS
*Director of the United States Patent and Trademark Office*